(12) United States Patent
Baldauf et al.

(10) Patent No.: US 7,866,680 B2
(45) Date of Patent: Jan. 11, 2011

(54) STEERING LOCK INDICATOR FOR SELF-STEERING AXLE

(75) Inventors: Jeffery A. Baldauf, Hesston, KS (US); Robert J. Waggoner, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 298 days.

(21) Appl. No.: 12/029,241

(22) Filed: Feb. 11, 2008

(65) Prior Publication Data

US 2009/0199603 A1 Aug. 13, 2009

(51) Int. Cl.
*B62D 13/02* (2006.01)
(52) U.S. Cl. .................................. 280/81.6; 280/149.2
(58) Field of Classification Search ................ 280/81.6, 280/149.2
See application file for complete search history.

(56) References Cited

U.S. PATENT DOCUMENTS 5,364,113 A * 11/1994 Goertzen .................... 280/81.6
6,131,691 A * 10/2000 Morch ......................... 180/418

* cited by examiner

*Primary Examiner*—Paul N Dickson
*Assistant Examiner*—Karen Jane J Amores
(74) *Attorney, Agent, or Firm*—Hovey Williams LLP

(57) ABSTRACT

A land vehicle includes a wheeled axle that is operable to be selectively self-steering. The axle includes a ground wheel that is operable to be selectively locked into a straight-ahead position so that self-steering is restricted. The land vehicle also includes a wheel lockout indicator system that is operable to sense when the ground wheel is locked in the straight-ahead position and can alert an operator by confirming that the ground wheel has been locked in the straight-ahead position.

12 Claims, 5 Drawing Sheets

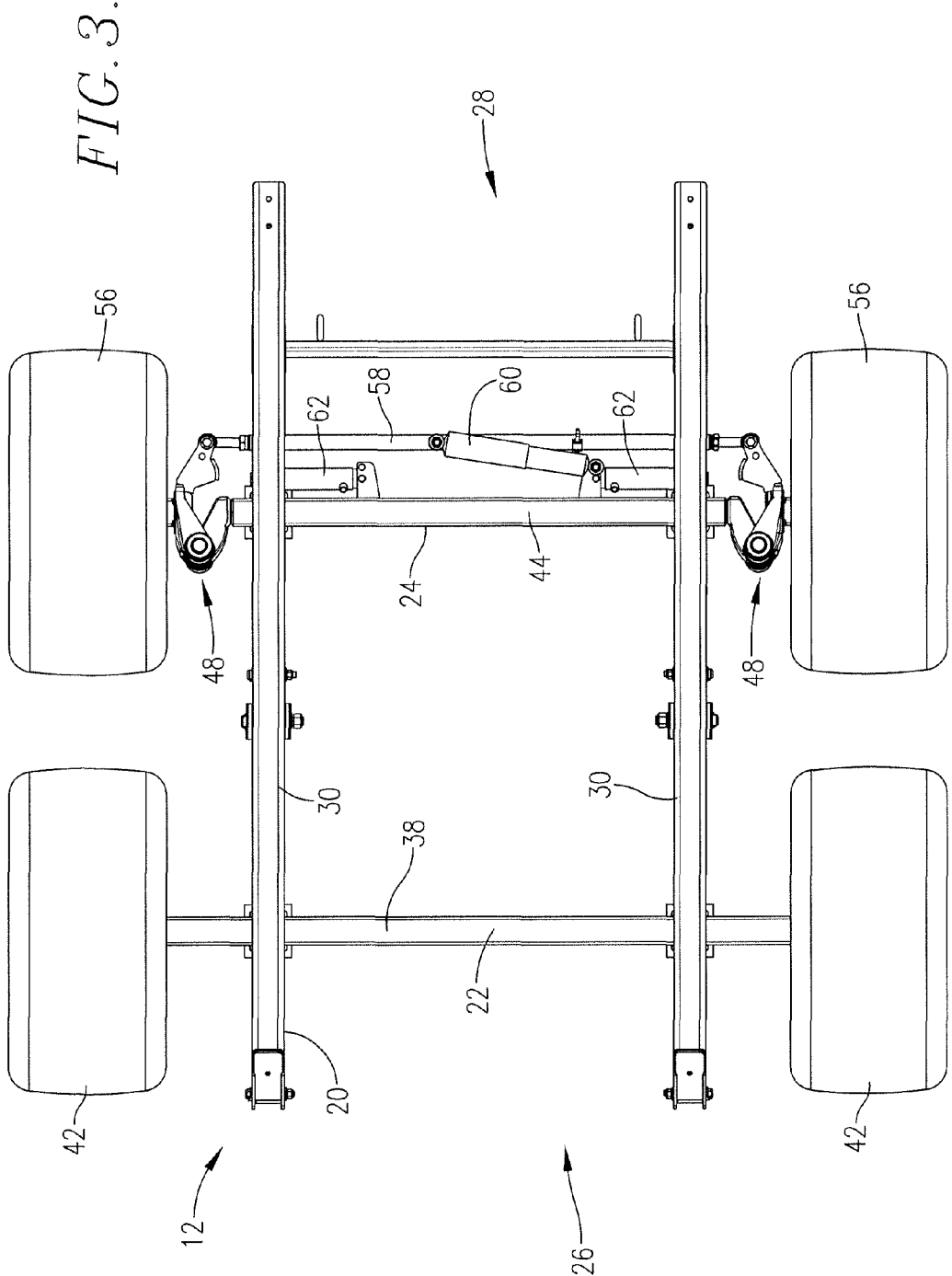

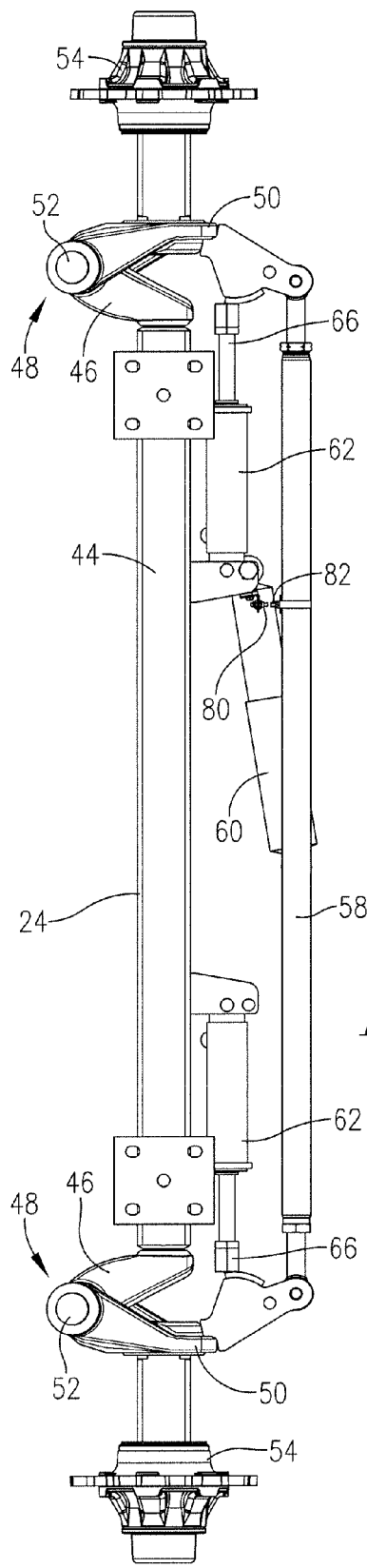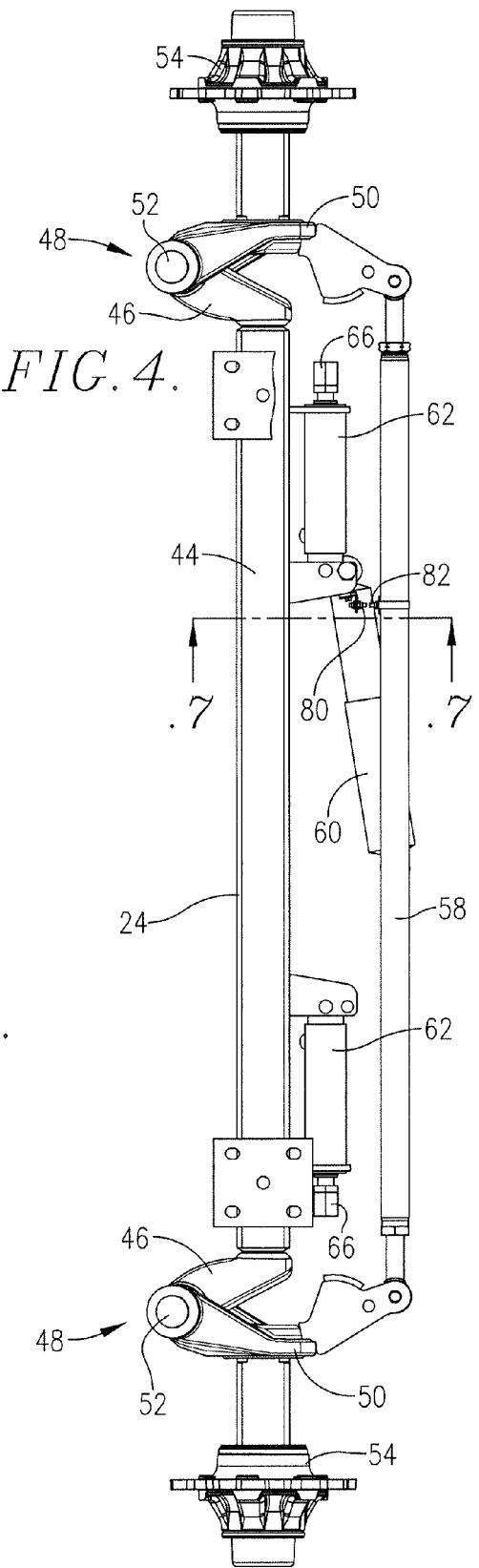

STEERING LOCK INDICATOR FOR SELF-STEERING AXLE

BACKGROUND

1. Field

The present invention relates generally to self-steering wheeled vehicles. More specifically, embodiments of the present invention concern a vehicle with a self-steering wheel and a system operable to indicate when the wheel is locked to restrict self-steering of the wheel.

2. Discussion of Prior Art

Agricultural vehicles that include multiple wheeled axles are known in the art. For instance, hay baling machines are typically heavy and require multiple axles to support the weight of the machine and the manufactured hay bale. However, prior art balers with multiple fixed axles were known to cause undesirable damage to the field as the baler was being turned. As a result, prior art self-steering balers with multiple axles were developed that included self-steering wheels so that some of the individual wheels could pivot in response to ground forces caused by turning the baler.

Vehicles that include self-steering wheels are problematic and suffer from various undesirable limitations. For example, prior art axles with self-steering wheels fail to smoothly and reliably steer the vehicle. At relatively high speeds, self-steering wheels tend to vibrate and lead to mechanical failure. Also, self-steering wheels can cause the vehicle to become unstable on uneven terrain.

SUMMARY

The present invention provides a vehicle with self-steering wheels that does not suffer from the problems and limitations of the prior art vehicles set forth above.

A first aspect of the present invention concerns a land vehicle including a wheeled axle with a self-steering ground wheel that is free to steer itself in response to rolling ground contact. The ground wheel is operable to be selectively locked by an operator-actuated locking mechanism into a straight-ahead position so that self-steering of the wheel is restricted. A wheel lockout indicator system is operable to sense when the ground wheel is locked into the straight-ahead position by the locking mechanism and in response thereto alert an operator to confirm that the ground wheel has been locked in the straight-ahead position.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 3 is a fragmentary top view of the hay baler shown in FIGS. 1 and 2, showing steerable and non-steerable axles of the chassis connected by a chassis frame;

FIG. 4 is a fragmentary bottom view of the hay baler shown in FIGS. 1-3, showing a hydraulic system attached to the steerable axle, with the hydraulic system including a pair of hydraulic cylinders retracted to permit the axle to self-steer;

FIG. 5 is a fragmentary bottom view of the hay baler shown in FIGS. 1-4, showing the hydraulic cylinders extended to restrict the axle from self-steering;

Figure 1:
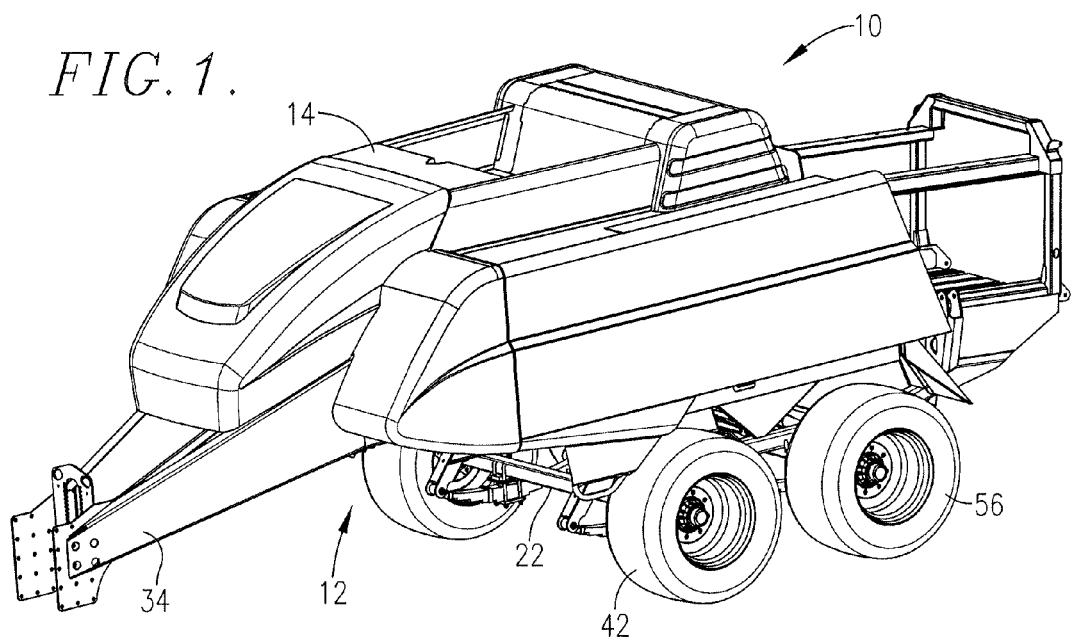
FIG. 1 is a fragmentary perspective view of a hay baler constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 9:
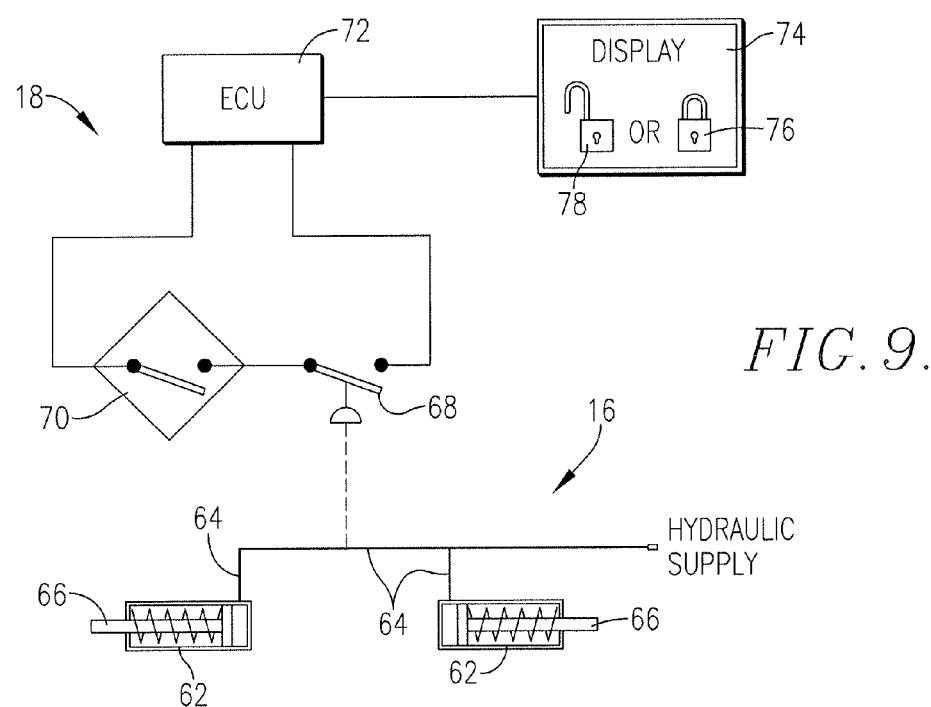
FIG. 9 is a schematic view of the hay baler shown in FIG. 1, showing the wheel lockout indicator system operably coupled to the hydraulic system, and showing the hydraulic cylinders retracted.
Figure 2:
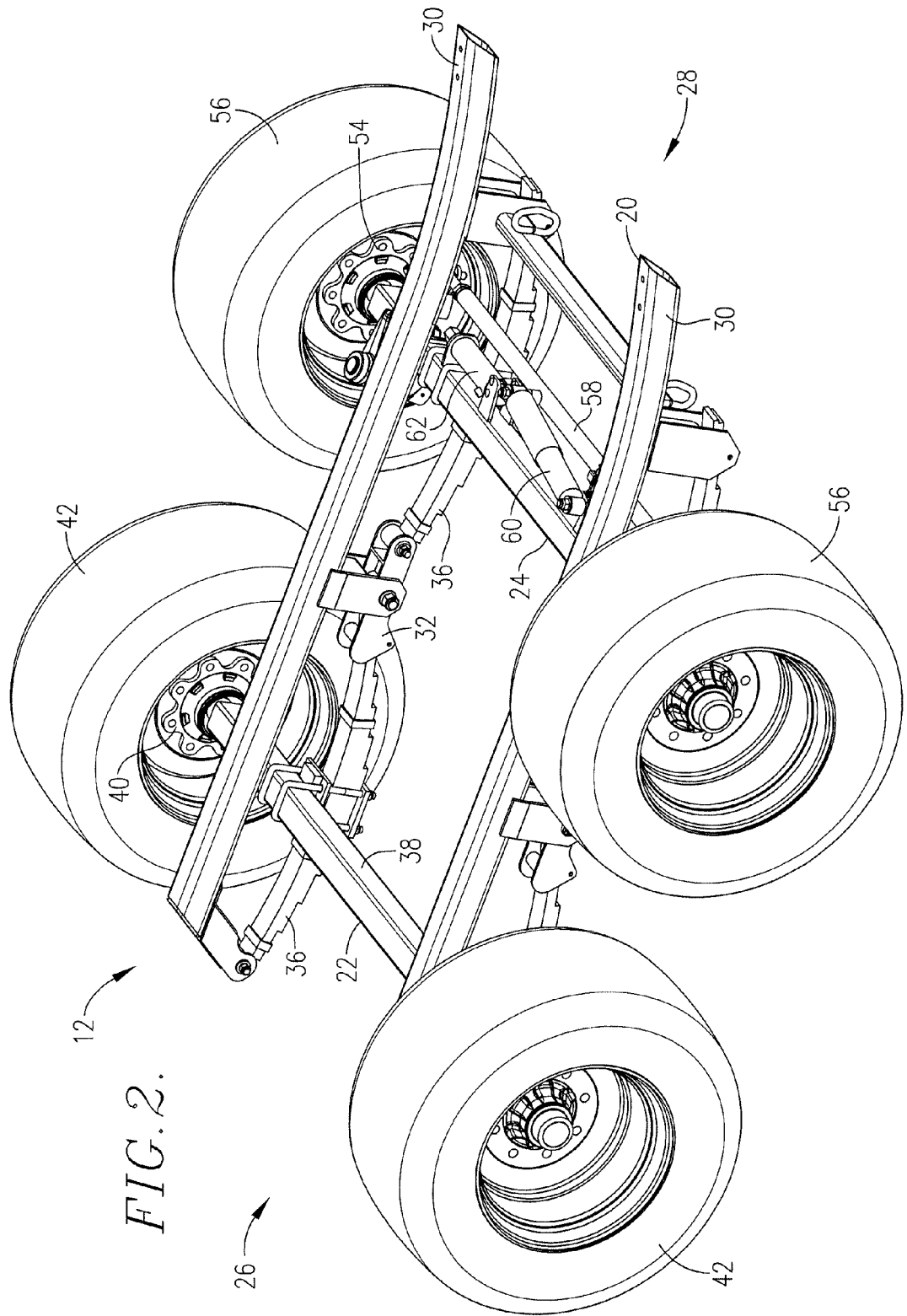
FIG. 2 is a fragmentary perspective view of the hay baler shown in FIG. 1, showing a steerable chassis.
Figure 6:
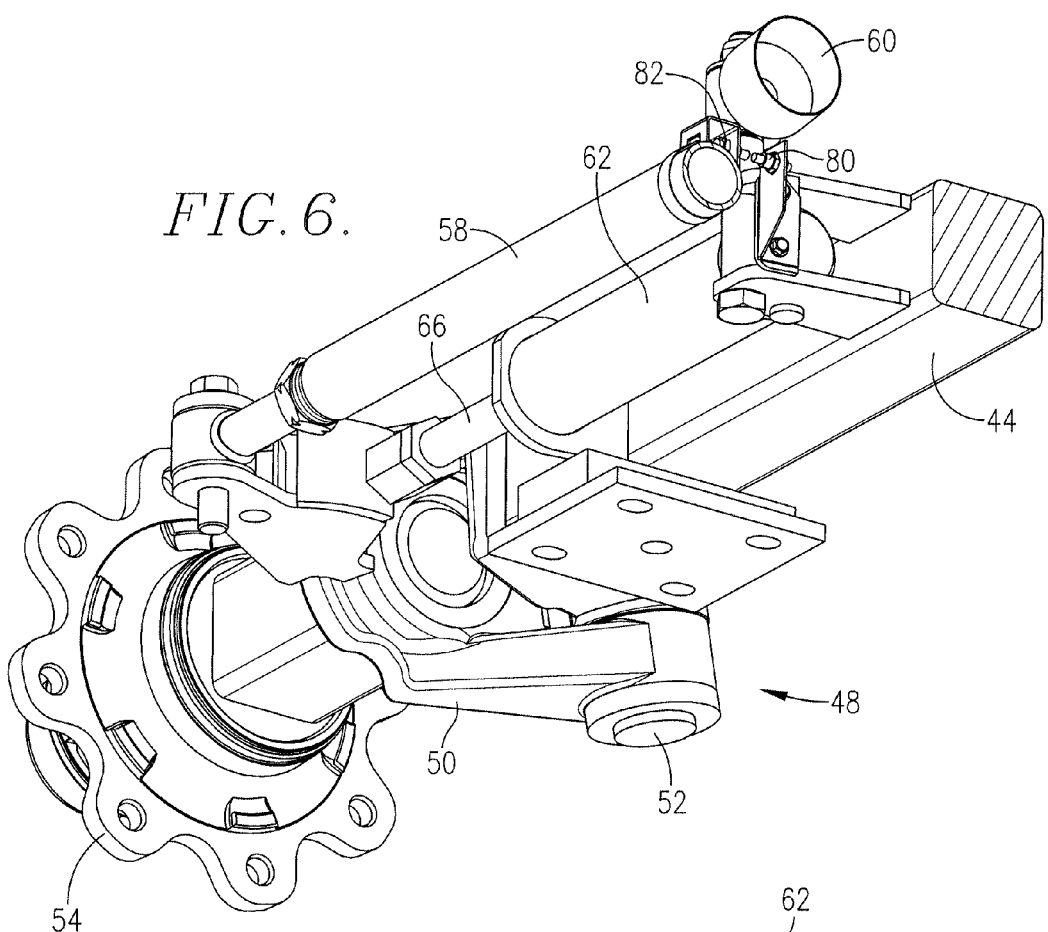
FIG. 6 is a fragmentary perspective view of the hay baler shown in FIGS. 1-5, showing a proximity sensor of a wheel lockout indicator system attached to the axle and configured to sense a straight-ahead position of the wheels of the axle.
Figure 8:
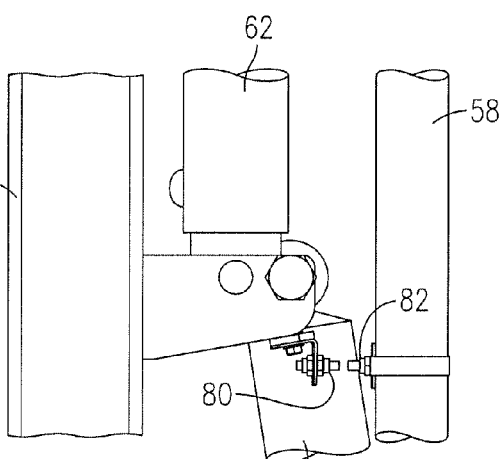
FIG. 8 is a fragmentary bottom view of the hay baler shown in FIGS. 1-7, showing the proximity sensor attached to the axle.
Figure 7:
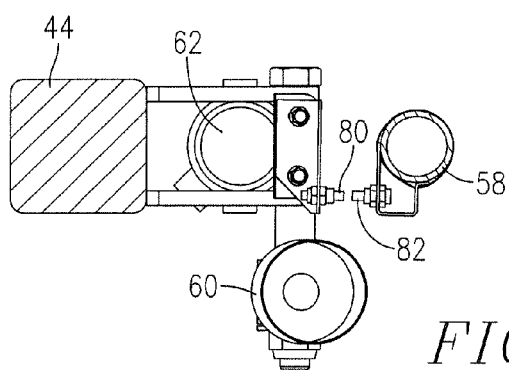
FIG. 7 is a fragmentary cross-sectional view of the hay baler shown in FIGS. 1-6, showing the proximity sensor attached to the axle.

Turning initially to FIGS. 1 and 9, a hay baler 10 is operable to be towed by a towing vehicle (not shown) across ground. The hay baler 10 can be configured by a user to either travel across the ground while being free to steer itself or to travel across the ground while being restricted from self-steering. The illustrated hay baler 10 picks up a hay windrow from the ground and arranges the picked up hay into one or more hay bales. However, it is also within the scope of the present invention where the hay baler 10 is another type of land vehicle, such as a self-propelled vehicle or another type of towed vehicle. Furthermore, the towed vehicle could include various types of equipment or attachments, e.g., the towed vehicle could be a material hauling wagon, a flat-bed trailer, or another vehicle that could benefit from including a selectively self-steering chassis. The hay baler 10 broadly includes a chassis 12, a baler assembly 14, a hydraulic system 16, and a wheel lockout indicator system 18.

Turning to FIGS. 2-5, the chassis 12 is a rolling chassis that serves to support the baler assembly 14 as the baler assembly 14 picks up the windrow and manufactures the hay bales. The chassis 12 includes a frame 20, a fixed axle assembly 22, and a steerable axle assembly 24. The frame 20 presents front and rear ends 26,28 and includes rails 30 that extend between the ends 26,28. The rails 30 are interconnected by a rear crossmember and each rail 30 also has a pivotal link 32 that is pivotally attached to a central bracket of the rail 26. The frame 20 also includes a drawbar 34 (see FIG. 1) coupled to the rails 26 and extending to the front end 26 for attachment to the towing vehicle.

The axle assemblies 22,24 are shiftably attached to the frame 20 by respective pairs of leaf spring assemblies 36 and rollably support the frame 20 above the ground. The fixed axle assembly 22 includes an elongated axle housing 38 and spindles 40 rotatably mounted at opposite ends of the housing 38. The fixed axle assembly 22 also includes wheels 42 that are each mounted to one of the spindles 40.

The steerable axle assembly 24 includes an elongated axle housing 44 with an elongated body and fixed arms 46 that are fixed to opposite ends of the elongated body. The fixed arms 46 each preferably extend forwardly of the elongated body to present a pivot end 48. The steerable axle assembly 24 also includes pivot arms 50 that are each pivotally attached to corresponding fixed arms 46 with a kingpin 52 in the usual manner. Thus, the arms 46,50 cooperatively form pivotal joints that permit relative pivotal movement about a substantially upright pivot axis. The steerable axle assembly 24 also includes spindles 54 rotatably mounted to corresponding pivot arms 50 and wheels 56 that are each mounted to one of the spindles 54. While the steerable axle assembly 24 preferably includes a pair of wheels 56, it is also within the scope of the present invention where the steerable axle assembly 24 includes only one wheel, e.g., a caster wheel, or more than two wheels.

The steerable axle assembly 24 also includes an elongated tie-rod 58 that is pivotally connected to a rear end of each pivot arm 50 and thereby operably interconnects the pivot arms 50. In the usual manner, the tie-rod 58 serves to synchronize pivotal movement of the pivot arms 50 so that the pivot arms 50 are operable to pivot substantially at the same time and in the same pivotal direction.

The steerable axle assembly 24 also preferably includes a damper 60. The damper 60 is a conventional motion dampening device and is pivotally attached to the tie-rod 58 and the axle housing 44. Thus, the damper 60 is operable to dampen relative shifting movement between the tie-rod and the axle housing 44. The principles of the present invention are also applicable where the damper 60 is not included in the steerable axle assembly 24.

The steerable axle assembly 24 is preferably positioned adjacent the rear end 28 and is shiftably attached to the frame 20 in the usual manner by a pair of the leaf spring assemblies 36 that are each attached to a respective pivotal link 32 and to a rear bracket of the respective rail 26. The fixed axle assembly 22 is preferably spaced forwardly of the steerable axle assembly 24 and is also shiftably attached to the frame 20 by another pair of the leaf spring assemblies 36. However, the principles of the present invention are applicable where the axle assemblies 24 are arranged differently, e.g., where the fixed axle assembly 22 is positioned adjacent the rear end 28 and the steerable axle assembly 24 is spaced forwardly of the fixed axle assembly 22. Furthermore, the wheels 56 of the steerable axle assembly 24 are operable to be aligned with the wheels 42 of the fixed axle assembly 22 in a straight-ahead position, i.e., where the wheels 42,56 are aligned with one another so as to restrict turning of the chassis 12. In other words, with the wheels 56 in the straight-ahead position, the chassis 12 is operable to roll over the ground in a substantially straight line, in either a forward or backward direction.

Turning to FIGS. 4-6 and 9, the hydraulic system 16 includes hydraulic cylinders 62, hydraulic lines 64, and a hydraulic supply that stores hydraulic fluid and pumps the fluid in the usual manner. The hydraulic cylinders 62 each have a piston 66 that is shiftable between a retracted position (see FIG. 4) and an extended position (see FIG. 5). Preferably, the piston 66 is spring-loaded so that it is normally in the retracted position. The hydraulic cylinders 62 are attached to the axle housing 44, with the pistons 64 projecting outwardly toward respective pivot arms 50. Hydraulic fluid is selectively provided by the hydraulic supply so as to pressurize the cylinders 62 and shift the pistons 66 from the retracted position to the extended position. In the extended position, the pistons 66 are positioned immediately adjacent to the pivot arms 50 so that pivotal movement of the pivot arms 50 is substantially restricted, i.e., the axle assembly 24 is in a locked condition. Similarly, the hydraulic supply can selectively remove pressure from the cylinders 62 and allow the pistons 66 to retract. In the retracted position, the pistons 66 are spaced apart from the pivot arms 50 so that pivotal movement of the pivot arms 50 is permitted and the axle assembly 24 is correspondingly in an unlocked condition. While the axle assembly 24 is preferably configured so that the extended position of the cylinders 62 corresponds to the locked condition and the retracted position corresponds to the unlocked condition, it is within the ambit of the present invention where the cylinders 62 are configured differently to provide the locked and unlocked conditions.

Turning to FIGS. 6-9, the wheel lockout indicator system 18 serves to alert the operator that the wheels 56 of the steerable axle assembly 24 have been locked in the straight-ahead position to restrict self-steering. When the operator actuates the hydraulic system 16 to lock the steerable axle assembly 24, the system 18 serves to confirm that the wheels 56 of the steerable axle assembly 24 are in fact locked in the straight-ahead position. The wheel lockout indicator system 18 preferably includes a pressure switch 68, a proximity switch 70, an electronic control unit 72, and a display 74.

The display 74 is a visual interface that is operable to present either a locked indicia 76 or an unlocked indicia 78. While the display 74 preferably provides visual indicia associated with confirming whether the wheels 56 of the steerable axle assembly 24 are locked or unlocked, it is also within the scope of the present invention where the display 74 provides another type of alert to the operator, such as an audible signal, e.g., a horn sound. The display 74 is operably coupled to the electronic control unit 72 that controls which of the indicia 76,78 are presented to the operator. The electronic control unit 72 controls the indicia in response to the operation of the switches 68,70, as will be discussed.

The pressure switch 68 is fluidly connected to the hydraulic lines 64 and is also operably coupled to the electronic control unit 72. The illustrated switch 68 is preferably a conventional pressure switch that senses pressure and one such pressure switch is manufactured by Hobbs and is designated as Part No. 78528. The pressure switch 68 is preferably a normally open switch and is operable to close in response to substantial pressure within the hydraulic system 16. Thus, when the cylinders 62 are pressurized by the hydraulic supply, the hydraulic pressure causes the pressure switch 68 to close. As pressure is removed from the cylinders 62, the pressure switch 68 opens again.

The proximity switch 70 comprises a conventional proximity sensor that senses whether the wheels 56 of the steerable axle assembly 24 are in the straight-ahead position. The proximity switch 70 includes sensor elements 80,82, with one element 80 being attached to the axle housing 44 and the other element 82 being attached to the tie-rod 58. Thus, the elements 80,82 shift relative to one another as the axle assembly 24 self-steers. When the wheels 56 of the steerable axle assembly 24 are positioned in the straight-ahead position, the elements 80,82 are positioned immediately adjacent to one another. The proximity switch 70 is preferably a switch supplied by George Risk Industries and is designated as Part No. P-20A SPECIAL.

The proximity switch 70 is operably coupled to the electronic control unit 72 and to the pressure switch 68. When the elements 80,82 are positioned immediately adjacent to one another, they cooperatively provide a closed switch. In any other relative position, the elements 80,82 cooperatively open the switch. Thus, when the wheels 56 of the steerable axle assembly 24 are in the straight-ahead position, the switch 70 is closed. When the wheels 56 are not in the straight-ahead position, the switch 70 is open.

The switches 68,70 are preferably arranged in series with one another to form a circuit that is operably coupled with an input of the electronic control unit 72. When either one or both of the switches 68,70 are open, the circuit is in an open condition. When both of the switches 68,70 are closed, the circuit is in a closed condition. When the electronic control unit 72 senses an open circuit, the display 74 is actuated so that only the unlocked indicia 78 is displayed. When the electronic control unit 72 senses that the circuit is closed, the display 74 is actuated so that only the locked indicia 76 is displayed. While the switches 68,70 are preferably coupled to the electronic control unit 72 in the illustrated series arrangement, it is also within the scope of the present invention where the switches 68,70 are coupled differently. For instance, the switches 68,70 could each be coupled with a respective input of the electronic control unit 72. Thus, the logic of the electronic control unit 72 could detect when both inputs sense that the switches 68,70 are closed and could actuate the display 74 accordingly.

The wheel lockout indicator system 18 serves to confirm for the operator that the cylinders 62 have been pressurized to extend the pistons 64 and thereby lock the axle assembly 24, with the wheels 56 being locked in the straight-ahead position. In this manner, the operator can confirm that the hydraulic system 16 is locking the axle assembly 24 and that, in response to the locking action by the hydraulic system 16, the wheels 56 of the axle assembly 24 have become positioned into the straight-ahead position and are restricted by the hydraulic system 16 from moving out of the straight-ahead position. While the illustrated wheel lockout indicator system 18 is preferably configured to identify and confirm for the operator the straight-ahead position of the wheels 56, it is also within the scope of the present invention where the system 18 is operable to confirm another position of the wheels 56.

In operation, the hay baler 10 is operable to be towed across ground in either a straight line or in a turning configuration, with the wheels 56 being pivoted from the straight-ahead position. In some instances, the axle assembly 24 needs to be locked, with the wheels 56 locked in the straight-ahead position. For example, where the towing vehicle and hay baler 10 need to be driven in reverse, the illustrated axle assembly 24 can be locked so that the hay baler 10 can be backed up without the wheels 56 inadvertently pivoting out of the straight-ahead position. Thus, the operator actuates the hydraulic system 16 to extend the pistons 64 and lock the axle assembly 24. In some instances, the hydraulic system 16 may not have sufficient power to pivot the wheels 56 fully into the straight-ahead position, e.g., an obstacle on the ground prevents movement of the wheels 56, until the hay baler 10 rolls across the ground a nominal distance. Therefore, the system 18 will indicate that the wheels 56 are locked when the hydraulic system 16 is actuated and when the wheels 56 have fully pivoted into the straight-ahead position. When hydraulic pressure is removed from the system 16, the system 18 indicates that the wheels 56 are once again unlocked and permitted to pivot.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a land vehicle including a wheeled axle with a self-steering ground wheel that is free to steer itself in response to rolling ground contact, said ground wheel operable to be selectively locked by an operator-actuated locking mechanism into a straight-ahead position so that self-steering of the wheel is restricted, the improvement comprising:

a wheel lockout indicator system operable to sense when the ground wheel is locked into the straight-ahead position by the locking mechanism and in response thereto alert an operator to confirm that the ground wheel has been locked in the straight-ahead position, said locking mechanism including a locking element shiftable into and out of a locked position wherein the element substantially restricts the ground wheel from self-steering, said wheel lockout indicator system including a pair of sensors and an interface operably coupled with said sensors, one of said sensors being operable to sense when the ground wheel is disposed in the straight-ahead position and the other of said sensors being operable to sense when the locking element is in said locked position, said sensors being connected with the interface in such a manner that the ground wheel must be disposed in the straight-ahead position and said locking element must be disposed in said locked position before the interface can provide a signal to the operator that the ground wheel has been locked in the straight-ahead position.

2. The land vehicle as claimed in claim 1,
said one sensor comprising a position sensor that is attached relative to the wheeled axle to sense the straight-ahead position.

3. The land vehicle as claimed in claim 1,
said sensors comprising switches that are coupled in series with one another to form a circuit,
said switches being closed when sensing the respective positions, with the signal being provided in response to the circuit being closed.

4. The land vehicle as claimed in claim 1,
said locking mechanism comprising a hydraulic system that drives the locking element into and out of the locked position,
said other sensor comprising a pressure sensor in fluid communication with the hydraulic system and operable to sense when the hydraulic system is pressurized to shift the locking element into the locked position.

5. The land vehicle as claimed in claim 4,
said sensors comprising switches that are coupled in series with one another to form a circuit,
said switches being closed when sensing the respective positions, with the signal being provided in response to the circuit being closed.

6. The land vehicle as claimed in claim 1,
said interface comprising a visual display operable to present locking indicia that serves as the signal.

7. The land vehicle as claimed in claim 1,
said wheeled axle including another self-steering ground wheel, with the ground wheels operable to be simultaneously locked by the operator-actuated locking mechanism into the straight-ahead position.

8. The land vehicle as claimed in claim 7,
said wheeled axle including an axle housing and a pair of pivot arms that are each pivotally mounted to the axle housing and are pivotal about an upright axis, each of said ground wheels being rotatably mounted on a respective pivot arm, with each pivot arm having a locked location corresponding with the straight-ahead position.

9. The land vehicle as claimed in claim 8, said wheeled axle including a tie-rod that interconnects the pivot arms so that the pivot arms are operable to pivot simultaneously, said one sensor comprising a position sensor having a first part on the axle housing and second part on the tie rod for sensing the position of the tie rod.

10. The land vehicle as claimed in claim 9, said locking mechanism comprising a hydraulic system that drives the locking element into and out of the locked position, said other sensor comprising a pressure sensor in fluid communication with the hydraulic system and operable to sense when the hydraulic system is pressurized to shift the locking element into the locked position.

11. The land vehicle as claimed in claim 10, said hydraulic system including a hydraulic cylinder attached to the axle housing, said hydraulic cylinder including a shiftable piston that serves as the locking element.

12. The land vehicle as claimed in claim 10, said sensors comprising switches that are coupled in series with one another to form a circuit, said switches being closed when sensing the respective positions, with the signal being provided in response to the circuit being closed.

* * * * *